(12) United States Patent
Bunker

(10) Patent No.: US 6,457,567 B1
(45) Date of Patent: *Oct. 1, 2002

(54) LEAF SPRING FOR A DISC BRAKE

(75) Inventor: Kenneth James Bunker, Rearsby (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/762,978

(22) PCT Filed: Jul. 26, 1999

(86) PCT No.: PCT/GB99/02430

§ 371 (c)(1),
(2), (4) Date: Feb. 14, 2001

(87) PCT Pub. No.: WO00/09911

PCT Pub. Date: Feb. 24, 2000

(30) Foreign Application Priority Data

Aug. 15, 1998 (GB) ............................................. 9817751

(51) Int. Cl.$^7$ ......................... F16D 65/12; F16D 65/52; F16F 1/18

(52) U.S. Cl. ................ 188/18 A; 188/71.5; 188/73.38; 188/218 XL

(58) Field of Search ............................. 188/71.5, 18 A, 188/73.35, 218 XL, 218 A, 71.1, 205 A, 206 R, 250 E, 73.38, 71.7, 73.1, 205 R, 70.22, 70.73; 192/70.2, 70.19, 70.17, 70.16, 70.18, 70.21; 267/158

(56) References Cited

U.S. PATENT DOCUMENTS

| | | | |
|---|---|---|---|
| 2,724,252 A | 11/1955 | Schmal | |
| 2,737,033 A | 3/1956 | Bendall | |
| 2,764,261 A | 9/1956 | Bridges | |
| 3,146,860 A | 9/1964 | Wilson | |
| 3,191,735 A | 6/1965 | Wavak | |
| 3,233,704 A | 2/1966 | Strain et al. | |
| 3,754,624 A | * 8/1973 | Eldred | 188/71.5 |
| 3,837,420 A | 9/1974 | Kobelt | |
| 3,844,385 A | 10/1974 | Szekely | |
| 3,915,272 A | * 10/1975 | Maurice | 192/70.2 |
| 4,256,209 A | * 3/1981 | Lüpertz | |
| 4,479,569 A | 10/1984 | Kummer et al. | |
| 4,534,457 A | * 8/1985 | Eltze et al. | 192/70.2 |
| 4,673,065 A | 6/1987 | Gerard et al. | |
| 4,699,254 A | 10/1987 | Mery | |
| 4,844,206 A | * 7/1989 | Casey | 188/18 A |
| 4,863,000 A | 9/1989 | Patel | |
| 4,865,160 A | 9/1989 | Casey | |
| 5,005,676 A | 4/1991 | Gassiat | |

(List continued on next page.)

FOREIGN PATENT DOCUMENTS

| | | |
|---|---|---|
| DE | 2039003 | 2/1971 |
| DE | 3740373 | 6/1988 |
| EP | 0096553 | 12/1983 |

(List continued on next page.)

Primary Examiner—Douglas C. Butler
(74) Attorney, Agent, or Firm—Reising, Ethington, Barnes, Kisselle, Learman & McCulloch, P.C.

(57) ABSTRACT

A disc brake (10) comprising at least two discs (12, 14), and a hub (16) which is arranged to rotate about an axis (18) thereof. The system (10) also comprises mounting arrangement (20,22) by which the discs (12, 14) are mounted on the hub (16) so that the hub and the discs rotate as a unit about the axis (18) and the discs can perform axial sliding movement on the hub. The system (10) also comprises a plurality of leaf springs (42) mounted on the hub (16) and engaging the discs (12, 14) so that the springs apply force between the discs and the hub. The leaf springs (42) are arranged in groups, one spring in each group acting on each disc, at least one spring in each group being retained in position by a connection (44) to another spring in the group.

16 Claims, 3 Drawing Sheets

U.S. PATENT DOCUMENTS

| | | | |
|---|---|---|---|
| 5,358,079 | A | 10/1994 | Brown |
| 5,402,865 | A | 4/1995 | Harker |
| 5,674,026 | A | 10/1997 | Ishibashi et al. |
| 6,056,089 | A | 5/2000 | Karlsson et al. |
| 6,131,932 | A | 10/2000 | Bunker |
| 6,223,863 | B1 | 5/2001 | Bunker |
| 6,244,391 | B1 | 6/2001 | Bunker |
| 6,247,560 | B1 * | 6/2001 | Bunker ............... 188/18 A |
| 6,298,953 | B1 | 10/2001 | Bunker |
| 6,305,510 | B1 * | 10/2001 | Bunker ............... 188/73.38 |

FOREIGN PATENT DOCUMENTS

| | | | |
|---|---|---|---|
| GB | 0662071 | | 11/1951 |
| GB | 0949018 | | 2/1964 |
| GB | 1091693 | | 11/1967 |
| GB | 1139699 | | of 1969 |
| GB | 1396503 | * | 6/1975 |
| GB | 1530461 | | 11/1978 |
| GB | 2031538 | | 4/1980 |
| GB | 2150263 | | 6/1985 |
| GB | 2164712 | | 3/1986 |
| GB | 2184801 | * | 7/1987 |
| GB | 2320299 | * | 6/1998 |
| GB | 2320300 | * | 6/1998 |
| GB | 2320301 | * | 6/1998 |
| GB | 2340561 | * | 2/2000 |
| GB | 2340562 | * | 2/2000 |
| GB | 2340563 | * | 2/2000 |
| GB | 2340564 | * | 2/2000 |
| GB | 2346940 | * | 8/2000 |
| GB | 2361973 | | 11/2001 |
| WO | 8905924 | | 6/1985 |
| WO | 9720150 | | 6/1997 |
| WO | 9825804 | * | 6/1998 |
| WO | 9826191 | | 6/1998 |
| WO | 9826192 | * | 6/1998 |
| WO | 0009900 | | 2/2000 |
| WO | 0009903 | | 2/2000 |
| WO | 0009904 | * | 2/2000 |
| WO | 0009905 | | 2/2000 |
| WO | 0009909 | | 2/2000 |
| WO | 0009911 | * | 2/2000 |
| WO | 0042332 | | 7/2000 |
| WO | 0133096 | | 5/2001 |
| WO | 0140671 | | 6/2001 |
| WO | 0186165 | | 11/2001 |
| WO | 0186167 | | 11/2001 |
| WO | 0103295 | | 12/2001 |

* cited by examiner

LEAF SPRING FOR A DISC BRAKE

This invention is concerned with a disc brake system, for example for a wheel of a vehicle.

A conventional disc brake system comprises a hub mounted on a suspension link for rotation relative thereto, the hub providing a mounting for a wheel, and a disc brake comprising a brake disc mounted for rotation with the hub, friction material pads arranged on opposite sides of the disc, and at least one piston and cylinder assembly operable to urge the pads into engagement with the disc, to brake the hub and hence the wheel. Conventionally, the piston and cylinder assembly is slidably mounted on a slide bolted to the suspension link of the vehicle. The disc is conventionally rigidly fixed to the hub, and wear of the pads and/or the disc is accommodated by the sliding movement of the cylinder.

Disc brake systems are known in which two discs are mounted on the same hub and rotate with the hub as a unit. Both discs can perform sliding movement on the hub, further friction material pads being provided between the discs, for example see GB 1 396 503. However, such systems are associated with technical problems. For example, since the discs are relatively thin, they tend to tilt on the hub and affect the braking ability. Also, there is a tendency for noise to be produced by rattle of the discs against the hub. At higher disc temperatures, these problems can be particularly severe since, when there is a large temperature differential, such as 600° C., between the braking surface of a disc and the hub, the disc expands considerably, away from the hub, exacerbating the problems of tilting and rattle. These problems are addressed in WO 98/26192 in which the solution proposed is to provide a plurality of resilient force applicators which are mounted between the hub and the discs, the force applicators acting to apply radially-directed forces to the discs to control the movement thereof, the force applicators being distributed circumferentially around the hub. In one of the embodiments proposed in WO 98/26192, the force applicators are flat steel leaf springs each of which acts between the hub and both discs. This arrangement has the disadvantage that the same springs act on both discs and the action of the springs on one of the discs affects their action on the other disc. This is undesirable since the individual discs may require an individual force regime. It would be possible to provide narrower springs so that each disc could have its own individual set of springs independently mounted on the hub but this would cause assembly problems which would increase if the system had more than two discs.

It is an object of the present invention to overcome the disadvantage mentioned above without increasing assembly problems.

The invention provides a disc brake system comprising at least two discs, and a hub which is arranged to rotate about an axis thereof, the system also comprising mounting means by which the discs are mounted on the hub so that the hub and the discs rotate as a unit about said axis and the discs can perform axial sliding movement on said hub, the system also comprising a plurality of leaf springs mounted on the hub and engaging the discs so that the springs apply radial force between the discs and the hub, characterised in that the leaf springs are arranged in groups, one spring in each group acting on each disc, at least one spring in each group being retained in position by a connection to another spring in said group.

In a disc brake system according to the invention, each disc has its own individual set of springs (one from each group) and the connections between the springs can readily be arranged such that the springs operate independently of one another. Each group of springs can be assembled on the hub by securing one of the group thereto or by securing the group as a whole thereto.

A disc brake system according to the invention may be of the type disclosed in WO 98/25804. That brake system comprises two discs which are slidable on the same hub under the control of leaf springs which act between the hub and the discs. The system also comprises a cylinder which is integrally formed with a suspension link and a caliper also fixed to the suspension link, the caliper having supports for friction material pads mounted thereon. In a system according to the invention, the leaf springs which act between the hub and the discs disclosed in WO 98/25804 would be replaced by groups of springs as disclosed herein. Each spring in the group may be a flat spring similar to those disclosed in WO 98/25804 or may have one of the forms disclosed hereinafter.

Preferably, each of the springs comprises at least three abutments which project transversely of the spring and engage the disc so that the abutments apply force to the disc. Said abutments may be provided by embossed portions of the spring. Such embossments may have a generally semi-cylindrical form. Alternatively, the abutments may be provided by material deposited on the spring and secured thereto.

Said abutments may be elongated so that each abutment remains in engagement with the disc throughout said movement of the disc on the hub.

Said abutments may be in the form of ridges extending parallel to the axis about which the hub rotates.

The leaf springs of a disc brake system according to the invention may be secured to the outer surface of the hub in a manner such that the springs extend tangentially of the hub when the disc is not mounted on the hub but are resiliently deformed by mounting a disc on the hub.

In a disc brake system according to the invention, cut-outs may be formed in the leaf springs to control the force applied by the springs to the discs. Such cut-outs may be in the form of holes through the spring or may be cut into the edges of the spring.

Said mounting means of the discs on the hub may comprise axially-extending grooves formed in an external surface of said hub and teeth projecting from said discs into said grooves, the teeth being a sliding fit in said grooves. In this case, said leaf springs may be located within said grooves and engage said teeth.

There now follows a detailed description, to be read with reference to the accompanying drawings, of a disc brake system which is illustrative of the invention.

Figure 1:
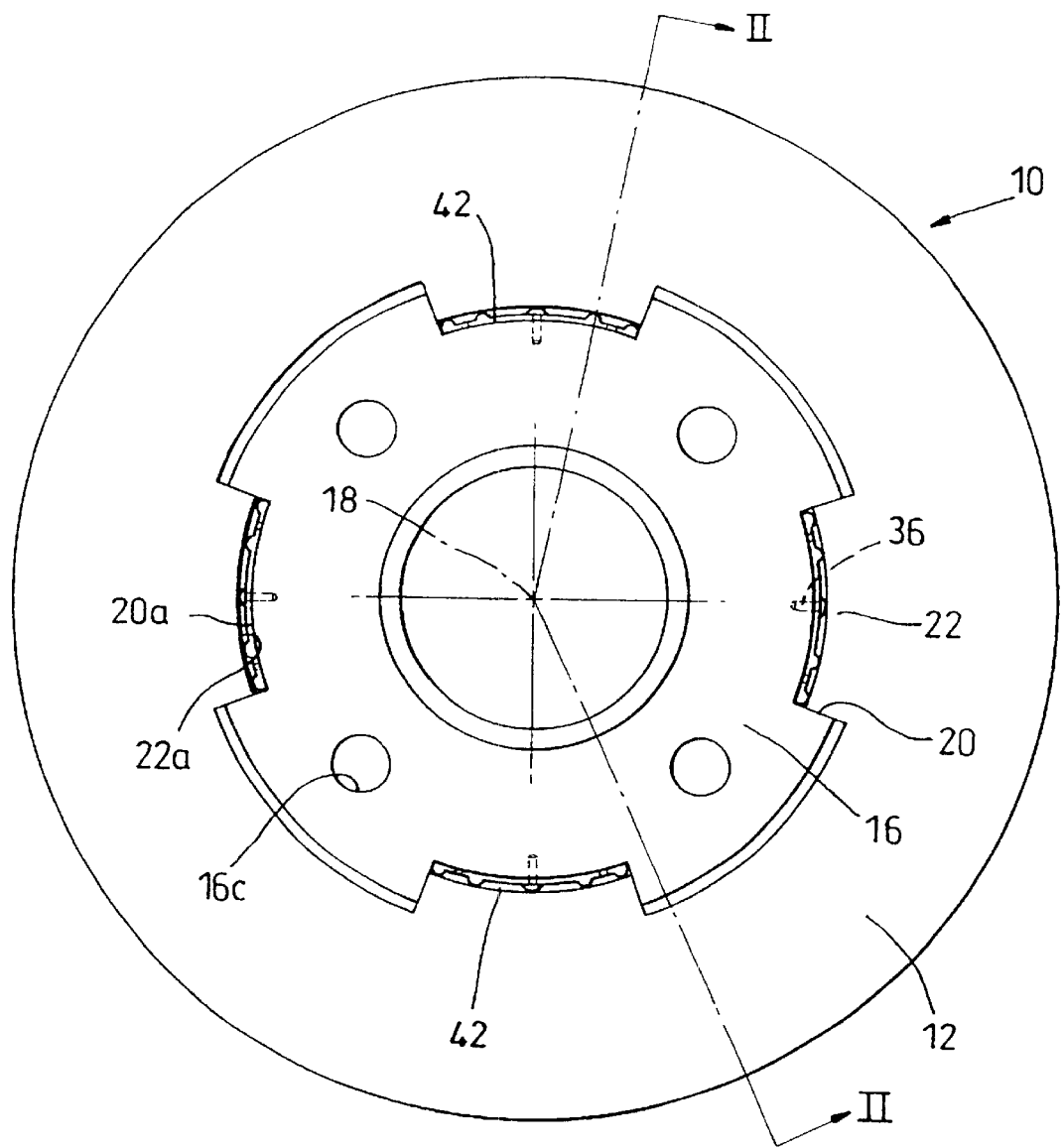
FIG. 1 is an end view of the illustrative disc brake system.
Figure 2:
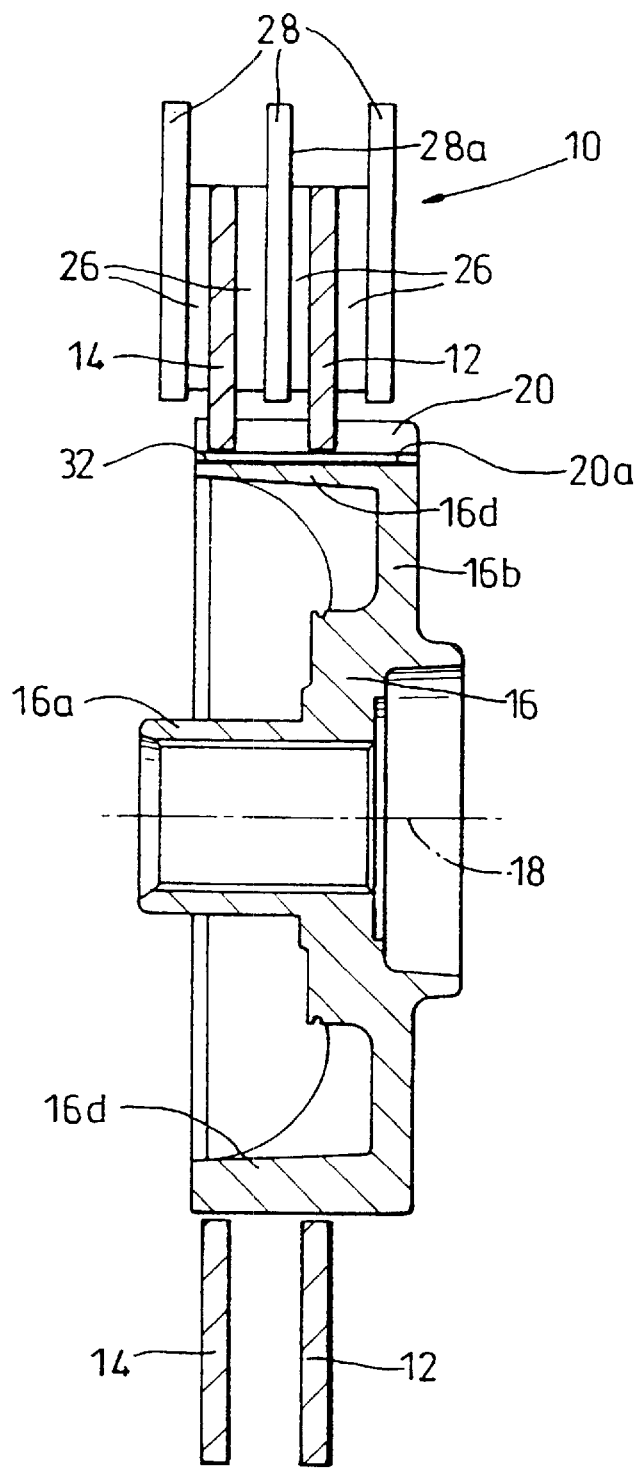
FIG. 2 is a cross-sectional view, on a larger scale, taken on the broken line II—II in FIG. 1.

The illustrative disc brake system 10 shown in FIGS. 1 and 2 is for a wheel (not shown) of a car. The system 10 comprises a disc 12, a further disc 14 and a hub 16, on which the wheel can be mounted. The hub 16 is arranged to rotate about a central axis 18 thereof.

The hub 16 comprises an internally splined hollow inner cylindrical portion 16*a* which is arranged to receive a drive shaft which drives the wheel. The hub 16 also comprises an external flange 16*b* at one end of the portion 16*a*. This flange 16*b* has four bolt holes 16*c* through which the wheel (not shown) can be bolted to the flange 16b in a conventional manner. The flange 16b also serves to connect the portion 16a to an outer hollow cylindrical portion 16d of the hub 16.

The discs 12 and 14 are identical to one another, being in the form of generally-annular cast iron or steel plates. The two discs 12 and 14 are mounted by means of mounting means of the system 10 on the cylindrical outer surface of the hub portion 16d so that the hub 16 and the two discs 12 and 14 rotate as a unit about the axis 18 and the discs 12 and 14 can perform axial sliding movement on said hub 16. The mounting means comprises four grooves 20 which are formed in the outer cylindrical surface of the portion 16d of the hub 16 and four teeth 22 which project inwardly from each of the discs 12 and 14. The teeth 22 enter the grooves 20 and are a sliding fit therein. However, the teeth 22 do not extend to the bottom surfaces 20a of the grooves 20, there being a clearance between the bottom surfaces 20a and the inner surfaces 22a of the teeth 22. The grooves 20 are equally-spaced circumferentially about the axis 18 and each occupies an arc of approximately 45° about the axis 18. Between the grooves 20, the outer surface of the hub portion 16d is machined to be accurately cylindrical about the axis 18. The inner surface of each disc 12 and 14, between the teeth 22, is also machined to be accurately cylindrical about the axis 18 and a close fit over the cylindrical portions of the outer surface of the hub portion 16d. The close fit of the discs 12 and 14 on the hub 16 reduces the possibility of the discs 12 and 14 tipping.

The system 10 also comprises four friction material pads 26 (FIG. 2) for braking the discs 12 and 14 by engaging side surfaces of the discs. The friction pads 26 are secured to three backing plates 28, one backing plate 28a being between the discs 12 and 14 and the others being on opposite sides of the discs 12 and 14 to the plate 28a. The median plate 28a has friction pads 26 secured to both of its faces. The brake pads 26 and the backing plates 28 are not shown in FIG. 1. The brake pads 26 are brought into braking contact with the discs 12 and 14 by operating means (not shown) which may be similar to that described in WO 98/25804. When the brakes are applied, a movable outer friction material pad 26 is moved until the four pads 26 and the discs 12 and 14 are all in contact with one another, the discs 12 and 14 and the plate 28a sliding axially to accommodate this movement.

The system 10 also comprises eight leaf springs 42 mounted on the hub 16 and engaging the discs 12 and 14 so that the springs 42 apply radial force between each of the discs 12 and 14 and the hub 16. The leaf springs 42 are arranged in four groups of two, the groups being equally distributed circumferentially around the hub 16, each being mounted on one of the bottom surfaces 20a of the grooves 20, ie the springs 42 are mounted in the grooves and act between the surface 20a and the inner surface 22a of the tooth 22 which enters the groove 20.

Figure 3:
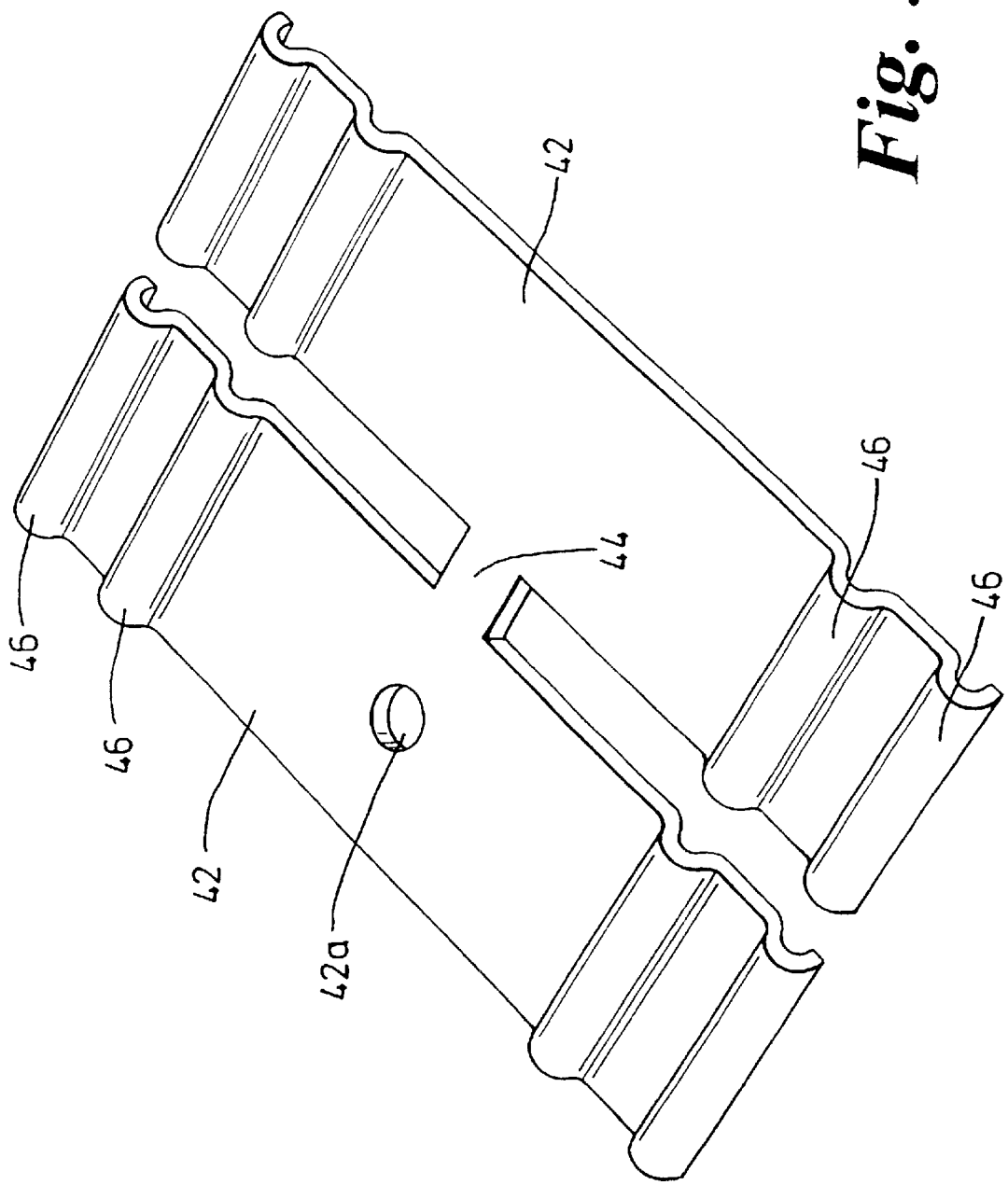
FIG. 3 is a perspective view, on a greatly enlarged scale, of a group of leaf springs of the illustrative disc brake system.

FIG. 3 shows one group of two leaf springs 42 which are joined together by a narrow tab 44, the springs 42 and the tab 44 being formed from a single sheet of spring steel which is 0.25–0.3 mm thick. The springs 42 are mounted on the surfaces 20a as a unit connected by the tab 44 by means of a screw 36 which passes through a hole 42a formed in one of the springs 42. Thus, each of the discs 12 and 14 has four of the leaf springs 42 acting thereon, the springs 42 being arranged in groups of two, one of which is mounted on the hub 16 and the other of which is retained in position by the connection, via the tab 44, to the first-mentioned spring. As the tab 44 is narrow, the springs 42 act substantially independently.

Each spring 42 extends axially on the hub 16 throughout the range of axial movement of its associated disc 12 or 14 so that both discs 12 and 14 are engaged by all four of its associated springs 42 continuously. The springs 42 act to control the sliding movement of the discs 12 and 14 on the hub 16 preventing tipping of the discs and compensating for thermal expansion effects.

Each spring 42 comprises four axially-extending abutments 46 which project transversely of the spring 42. Two of the abutments 46 are formed at the extreme ends of the spring 42, thereby preventing the edge of the spring 42 from engaging the tooth 22 and reducing the risk of cracking of the spring 42. Between the abutments 46 holes (not shown) may be cut out of the spring 42 to control the force applied by the abutments 46 to the disc 12 or 14.

The abutments 46 are provided by embossed portions of the spring 42 which are in the form of generally semi-circular (in transverse cross-section) ridges extending parallel to the axis 18. The abutments 46 are elongated in the axial direction so that each abutment 46 remains in engagement with its associated disc 12 or 14 throughout the movement of the disc on the hub 16.

Each spring 42 is arranged to engage the associated disc 12 or 14 with its abutments 46 and apply force to the disc to control the movement thereof on the hub 16. Each spring 42 is arranged so that the spring 42 extends generally tangentially of the hub 16 when the disc 12 or 14 is not mounted on the hub 16. However, the springs 42 are deformed by the presence of the disc 12 or 14 so that each abutment 46 presses resiliently on the disc. The springs 42, thus, act to apply radially-directed forces to the discs 12 and 14.

In the operation of the disc brake system 10, the springs 42, as aforementioned, control the sliding movement of the discs 12 and 14 on the hub 16. Each spring 42 engages a disc at four points of contact, provided by the abutments 46, thereby distributing the force applied by the spring 42 to each disc more uniformly.

In modifications of the springs 42, the hole 42a may be omitted and the springs provided instead with self-retaining means for retaining them on the hub 16. For example, such self-retaining means may comprise integral tabs extending from the spring over opposite ends of the hub 16 so that the springs can be clipped over the hub. Specifically, each of the end springs 42 in a group has one of the these tabs extending normally from its opposite edge to the position of the tab 44.

In a further modification, the springs 42 can be formed into a non-planar form in order to determine the forces they will apply to the disc. For example, the springs can be formed into an arcuate shape such that, when the spring is mounted on the hub but before the discs are mounted on the hub, the ends of the spring are further from the hub than if the spring were planar.

What is claimed is:

1. A disc brake system comprising at least two discs and a hub which is arranged to rotate about an axis thereof, the system also comprising mounting means by which the discs are mounted on the hub so that the hub and the discs rotate as a unit about said axis and the discs can perform axial sliding movement on said hub, the system also comprising a plurality of leaf springs mounted on the hub and engaging the discs so that the springs apply radial force between the discs and the hub, wherein the leaf springs are arranged in groups, one spring in each group acting on each disc, at least one spring in each group being retained in position by a connection to another spring in said group.

2. A disc brake system according to claim 1, wherein each of said springs comprises a plurality of abutments which project transversely of the spring and engage an associated one of the discs so that the abutments apply force to said associated one of said discs.

3. A disc brake system according to claim 2, wherein said abutments are provided by embossed portions of the spring.

4. A disc brake system according to claim 2, wherein said abutments are elongated so that each abutment remains in engagement with said associated one of said discs throughout said movement of said discs on the hub.

5. A disc brake system according to claim 2, wherein said abutments are in the form of ridges extending parallel to the axis about which the hub rotates.

6. A disc brake system according to claim 1, wherein the leaf springs are secured to the outer surface of the hub in a manner such that the springs extend tangentially of the hub when the discs are not mounted on the hub.

7. A disc brake system according to claim 1, wherein cut-outs are formed in the leaf springs to control the force applied by the springs to the discs.

8. A disc brake system according to claim 1, wherein the mounting means of the discs on the hub comprises axially-extending grooves formed in an external surface of said hub and teeth projecting from said discs into said grooves, the teeth being a sliding fit in said grooves, and in that said leaf springs are located within said grooves and engage said teeth.

9. A disc brake system according to claim 1, wherein the leaf springs are provided with self-retaining means for retaining them on the hub.

10. A disc brake system according to claim 1 wherein said connection between said springs is arranged such that the connected springs operate independently of one another.

11. A disc brake system according to claim 1 wherein said groups of springs are equally distributed circumferentially around said hub.

12. A disc brake system according to claim 1 wherein said connection between said springs comprises a tab extending between said springs and formed as one piece therewith of a sheet of the same material.

13. A disc brake system according to claim 1 wherein the springs of each group are mounted and secured to said hub as a unit by a single fastener.

14. A disc brake system according to claim 1 wherein one of said springs in said group is formed with a hole, and including a screw extending through said hole and engaging said hub.

15. A disc brake system according to claim 1 wherein said springs in each of said groups includes end springs having a self-retaining tab extending from edges of said end springs and clipped over respective opposite ends of said hub to secure said group of springs to said hub.

16. A disc brake system, comprising:
- a hub rotatable about an axis of said hub;
- at least two discs supported about said hub and slideable axially therealong while being supported against rotation relative to said hub;
- a plurality of leaf springs mounted on said hub and engaging said discs so that said springs apply radial force between said hub and said discs; and
- wherein said leaf springs are arranged in groups, one spring in each group acting on each disc, at least one spring in each group being retained in position by a connection to another spring in said groups.

* * * * *